United States Patent [19]

Wirsching

[11] Patent Number: 4,577,460
[45] Date of Patent: Mar. 25, 1986

[54] METHOD AND APPARATUS FOR GENERATING ENERGY

[76] Inventor: Wayne S. Wirsching, 85 Gentry Way, Reno, Nev. 89502

[21] Appl. No.: 195,798

[22] Filed: Oct. 10, 1980

[51] Int. Cl.[4] .............................................. F02C 3/14
[52] U.S. Cl. ................................................... 60/39.35
[58] Field of Search ..................... 60/39.35; 308/9, 10

[56] References Cited

U.S. PATENT DOCUMENTS

| | | | |
|---|---|---|---|
| 2,603,947 | 7/1952 | Howard | 60/39.35 |
| 2,628,473 | 2/1953 | Frye | 60/39.35 |
| 3,299,961 | 1/1967 | Coplin | 60/39.35 |
| 3,909,082 | 9/1975 | Ishikawa | 308/10 |
| 4,091,687 | 5/1978 | Meinke | 308/10 |
| 4,208,590 | 6/1980 | Blomquist | 60/39.35 |
| 4,285,553 | 8/1981 | Robinson | 308/10 |
| 4,337,981 | 7/1982 | Meinke | 308/10 |

Primary Examiner—Douglas Hart
Attorney, Agent, or Firm—Herbert C. Schulze

[57] ABSTRACT

This is a new method and apparatus for providing electrical or mechanical power output from the energy in low cost fuels in which a mechanism is mounted for rotation with one or more jet propulsion means secured to the mechanism to provide the rotation. The mechanism is suitable for generating electrical power from the rotation or for direct mechanical power takeoff. Friction reducing means are provided by the use of magnetic or pneumatic lifting of the mechanism during rotation.

1 Claim, 15 Drawing Figures

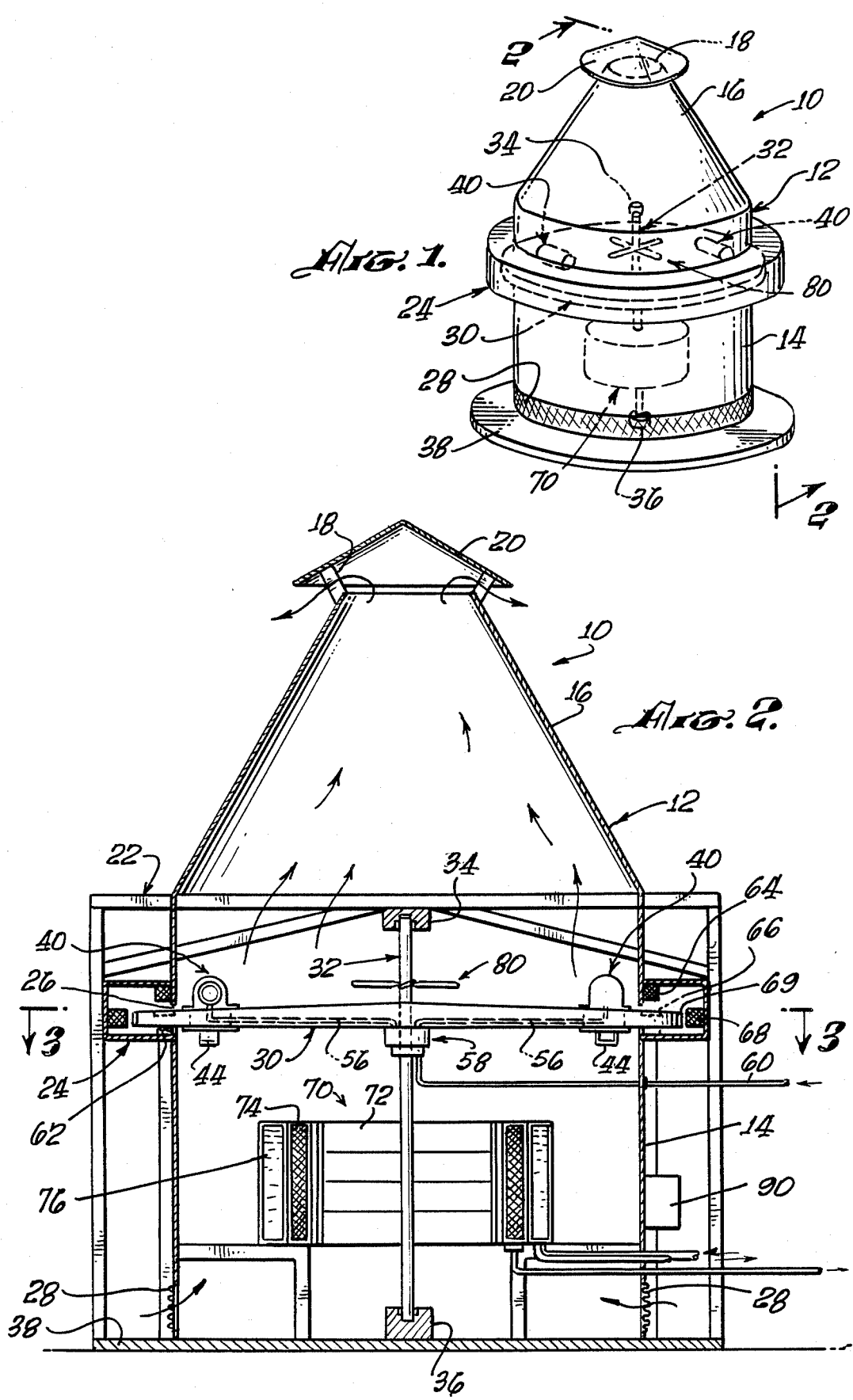

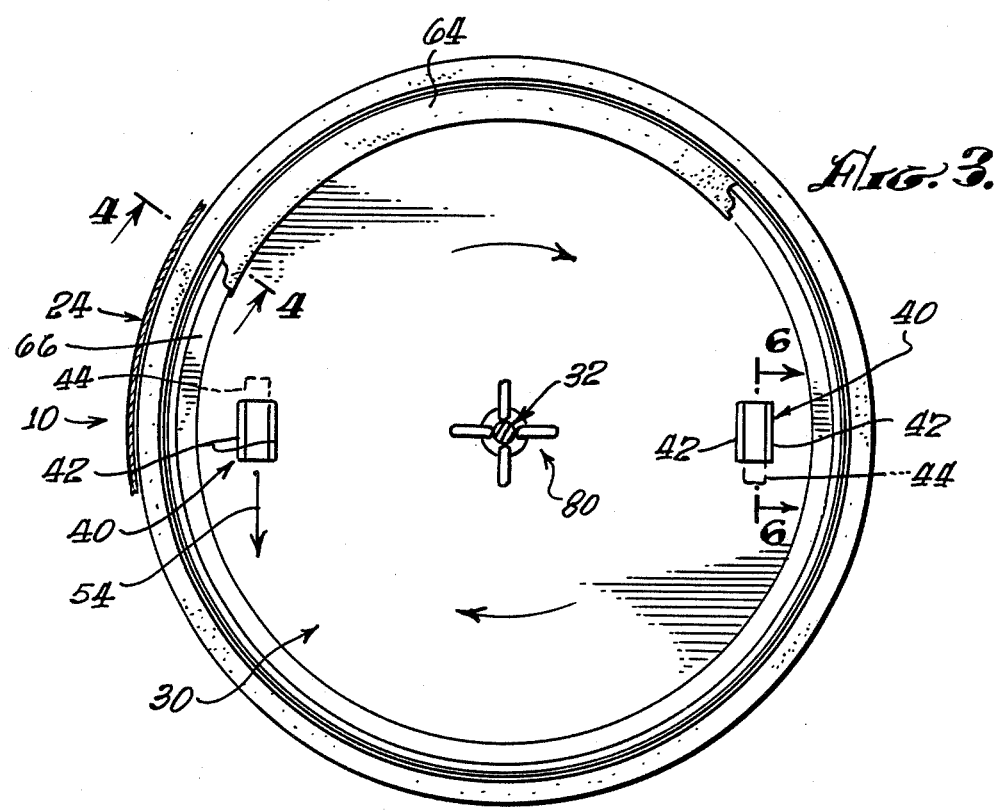
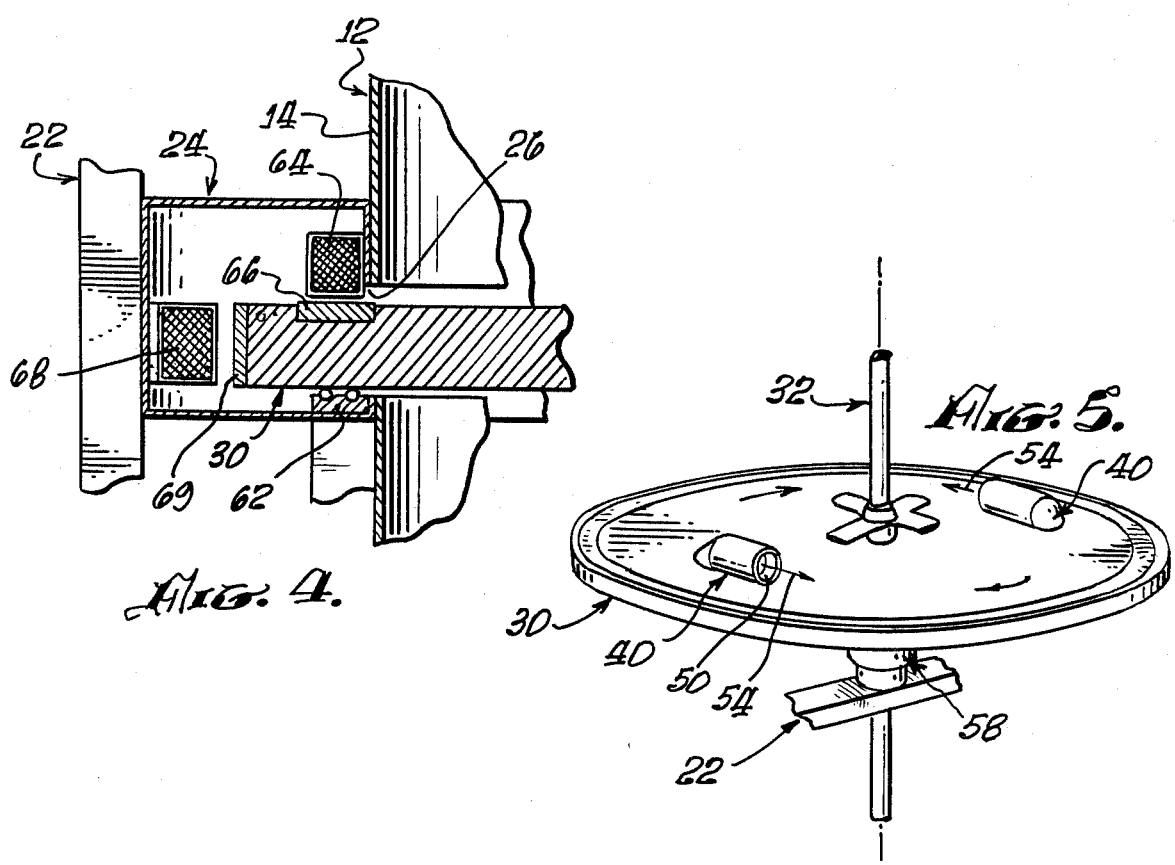

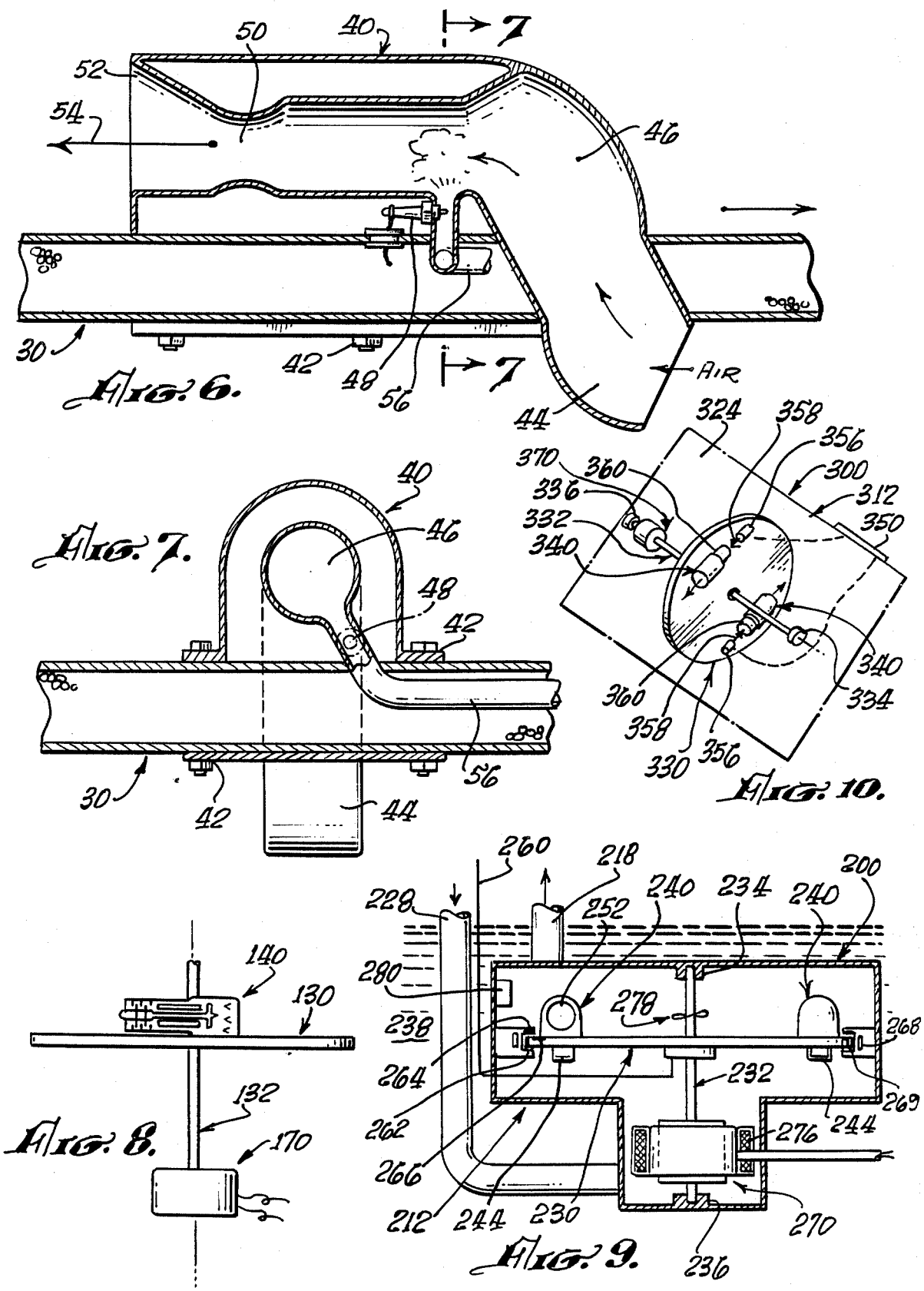

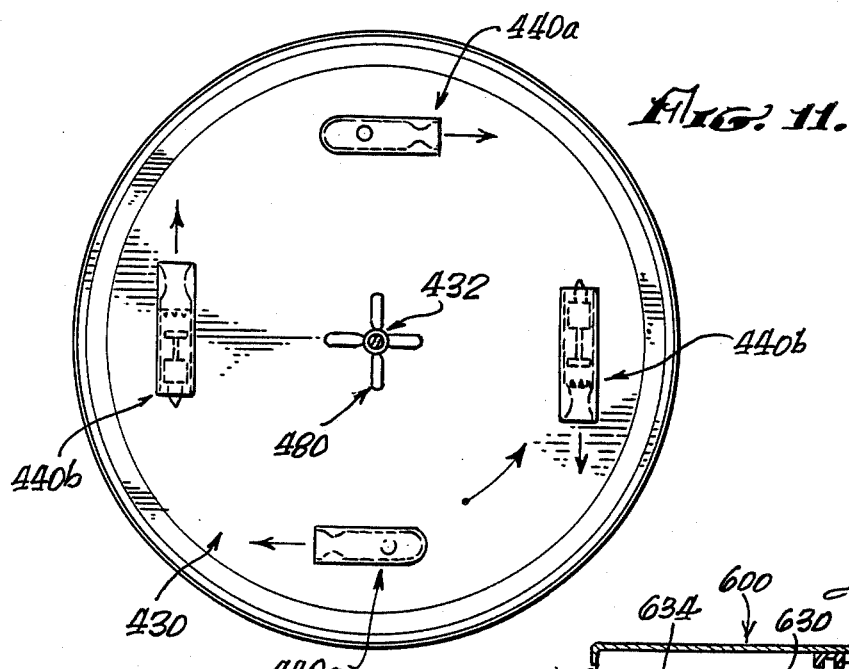
FIG. 11.
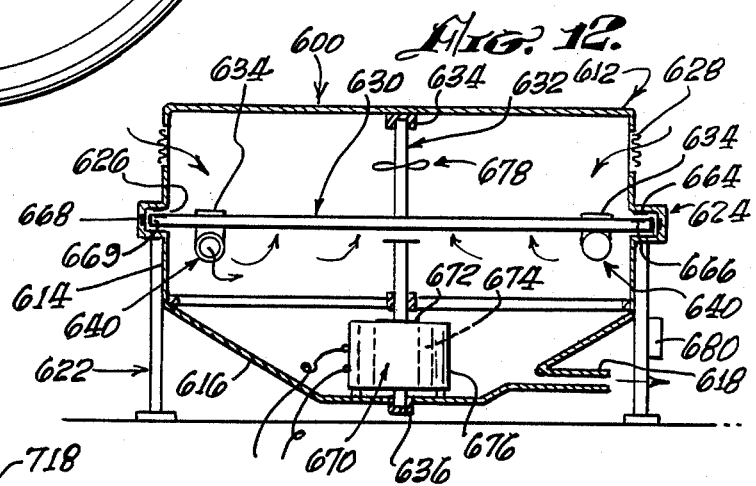
FIG. 12.
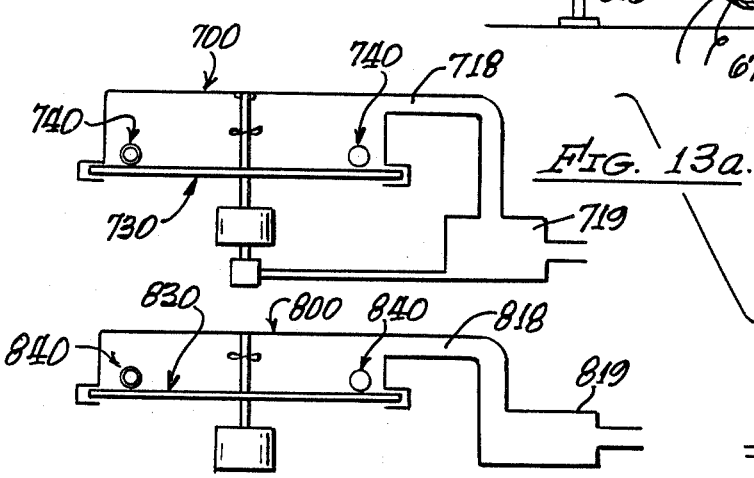
FIG. 13a.
FIG. 13.
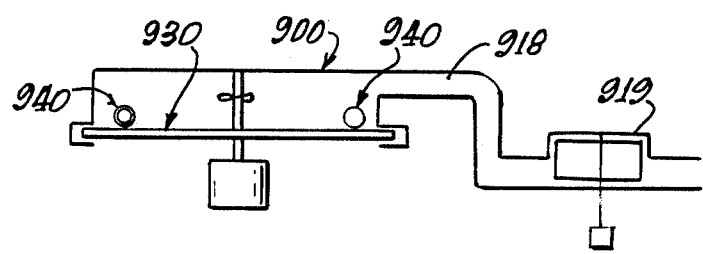
FIG. 13b.
FIG. 13c.

METHOD AND APPARATUS FOR GENERATING ENERGY

CROSS-REFERENCE TO RELATED PATENT APPLICATIONS

There are no related patent applications filed by me.

THE BACKGROUND OF THE INVENTION

1. Field of the Invention

This invention is in the general field of energy converting systems and more particularly in the field of producing electrical or mechanical output from low-cost fuels. The invention is even more particularly directed to a method and apparatus for producing usable mechanical or electrical energy by means of a rotating jet propulsion apparatus which is partially supported by a magnetic or pneumatic field of force.

2. Description of the Prior Art

I am unaware of prior art directly related to this invention. It is recognized that jet propulsion units are utilized in many different power conversion situations. However, in the present instance, a jet propulsion unit is connected to a mechanism through which the fuel is supplied over an indefinite period of time and as a result of the activity of which the mechanism is partially supported so as to reduce friction losses.

SUMMARY OF THE INVENTION

I have been engaged in the study of various methods and devices for the producing of a low-cost energy. I have also become familiar with the fuel and energy shortages in the United States and the desirability of achieving maximum effectiveness of apparatus for producing this energy.

It is well known that energy producing systems are generally very inefficient and very expensive to operate. It is also well known that tremendous power losses occur during the transport of energy from the generating source to the point of use.

A number of innovations have been made over the period of years which have attempted to produce energy at the point of use.

Most of these new systems are designed to include inefficient internal combustion engines which then operate a generating mechanism for the production of electricity.

All of the devices devised to date have a common quality of not achieving a substantial amount of energy output for the amount of fuel and expense of equipment in the manner of my invention.

I have now devised a method and apparatus wherein I utilize a simple mechanism capable of producing a substantial amount of energy at the site where the energy is to be used.

I have also devised a method in which I have reduced the frictional forces involved.

I have accomplished the foregoing by affixing one or more jet propulsion means to a mechanism which includes means for rotaty motion. In one form the mechanism is in the shape of a disc having fuel intake means. The fuel may be inexpensive gas, or the like. Ignition of the fuel for operation of the jet propulsion means attached to the disc may be accomplished through the generation of electrical energy during operation of the machine or it may be provided through diversion of friction, or by suitable independent battery, or the like.

The disc, in the preferred form, is rotatable and rests within a horizontal plane. Preferably the disc will be mounted upon an axle in a vertical position and the ultimate power takeoff may be from the periphery of the disc, or from the shaft itself.

It is an object of this invention to provide an efficient method and apparatus for producing a low-cost energy for use at a desired location.

Another object of this invention is to provide a method and apparatus for efficiently disposing of the exhaust created from such a device to perform other functions.

Another object of this invention is to provide a method and apparatus for producing rotation in a mechanical apparatus by means of a jet propulsion mechanism.

Another object of this invention is to provide a means for reducing friction by magnetic or pneumatic forces working with the mechanism.

Another object of this invention is to provide a device that can be installed beneath the sea and to operate in outer space by utilizing the principal of my invention.

The foregoing and other objects and advantages of this invention will become apparent to those skilled in the art upon reading the description of a preferred embodiment which follows in conjunction with the appended drawings.

A BRIEF DESCRIPTION OF THE DRAWINGS

FIG. 1 is a perspective view of a preferred embodiment of an apparatus to practice the method of this invention;

FIG. 2 is an enlarged, partially sectioned view taken on 2—2 of FIG. 1;

FIG. 3 is an enlarged, partially sectioned view on 3—3 of FIG. 2;

FIG. 4 is an enlarged, fragmentary, partially sectioned view on 4—4 of FIG. 3;

FIG. 5 is a simplified, schematic, perspective of certain of the elements utilized in the embodiment of this invention shown in FIG. 1;

FIG. 6 is an enlarged, partially sectioned view on 6—6 of FIG. 3;

FIG. 7 is an enlarged, partially sectioned view on 7—7 of FIG. 6;

FIG. 8 is a schematic elevational view illustrating an alternate type engine for utilization in this invention;

FIG. 9 is a schematic illustration of an enclosed module containing an apparatus to practice the method of this invention suitable for isolating the apparatus from the surrounding environment;

FIG. 10 is a schematic perspective of an apparatus to practice this method under special circumstances;

FIG. 11 is a plan view similar to FIG. 3 but showing an alternate embodiment of the engine combinations to be used in this invention;

FIG. 12 is a schematic side elevation similar to FIG. 2 showing an alternate arrangement of the jet propulsion unit and exhaust system; and FIG. 13 (FIGS. 13a, 13b and 13c) is a series of three schematic side elevations showing methods for utilization of the exhaust gases from the apparatus.

DESCRIPTION OF A PREFERRED EMBODIMENT

FIG. 1 is a perspective which illustrates, generally by the reference numeral 10, an assembly of the energy producing mechanism of my invention. A housing 12 comprised of a cylindrical side wall 14 and an upper tapered conical portion 16 terminates in an opening 18. A deflector 20 is mounted above the opening to divert exhaust gases from the energy producing mechanism and to protect the interior of the housing from foreign matter.

The enlarged cross-section of FIG. 2 indicates in more detail, a frame 22, which supports the housing 12. An annular chamber 24 is mounted onto the cylindrical side wall 14 of housing 12. An annular slot 26 is formed in the cylindrical side wall 14 of housing 12 and allows the outer periphery of a disc-like fly wheel member 30 to project therethrough. The housing 12 is provided with an air inlet opening 28 located at the lower portion of the side wall 14.

The disc-like fly wheel member 30 is affixed to a shaft assembly 32 which, in turn, is mounted for rotation within upper and lower bearings 34 and 36. The upper bearing 34 is mounted to the frame 22 and the lower bearing 36 is mounted to a base plate 38.

Mounted onto the upper surface of the member 30 are ramjet engine assemblies 40. I have illustrated a pair of such engines but it is to be understood that as little as one or any number over two can be installed, depending on the need.

The ramjet engines 40 are mounted to the disc fly wheel member 30 by means of mounting flanges and bolts 42. As seen in FIG. 6, a scoop 44 allows air to enter a mixing chamber 46 into the vicinity of an ignition glow plug 48 causing the air and fuel mixture to burn and then to exit through the venturi 50 and out of the open end 52 of the engine. The force of the jet stream into the direction of arrow 54 causes the disc fly wheel 30 to rotate in a clockwise direction.

A fuel line 56 supplies fuel to the mixing chamber of the jet engine and is connected to a rotary connector assembly 58. Fuel from a supply reservoir is brought into the rotary connector means 58 through a fuel line 60.

At low rotational speeds and when it is at rest, the disc-like fly wheel member 30 rides upon a bearing assembly 62. When electrical current is applied to a levitation coil 64, a magnetic attraction is brought about that tends to lift a magnetic ring 66, made of steel or the like, upwardly away from the bearing assembly 62. This allows a condition of minimal friction for the disc-like fly wheel assembly and its shaft assembly 32 during rotation. The whole assembly 10 can be made mobile on the back of a vehicle.

An electromagnetic coil assembly 68 is placed just outside the periphery of the disc member 30 and a series of magnets 69 are affixed to the periphery of the member 30. When the disc member 30 begins rotation an electrical current is formed in the coil 68 and provides the electrical input necessary for the magnetic levitation coil 64 to operate and provides the electrical energy necessary for igniting the ramjet combustion process.

Mounted to the lower portion of shaft assembly 32 is a rotor portion 72 of an electrical generator 70. Mounted to the frame 22 is a stator 74 of the generator 70. As the shaft 14 rotates, electricity is generated and is taken to the point of need. A refrigerating means 76 is placed about the generator 70 and cools the generator during its operation.

A secondary means for lifting of the combined load of the disc 30, the shaft assembly 32 and the generator rotor 72 of the generator 70, is shown by the reference numeral 80. These canard type blades aerodynamically help lift the assembly described. A Coanda effect lifting means can also be affixed to the shaft assembly 32 and aid in the lifting of the components described.

A control unit 90 which can be mounted to the frame or housing is provided in order to affect the speed of the rotating elements and to change the vanes on the lift means 80 to keep a proper speed. Such a control unit can be constructed of manual controls or a computerized self-operating unit.

FIG. 8 shows a schematic view of an alternate embodiment employing a turbofan type of engine 140 mounted onto a disc 130. This assembly is affixed to a shaft 132 which operates a generator 170. This embodiment may be used where high rotational speeds are not deemed necessary.

FIG. 9 is a second alternate embodiment wherein the generating assembly 200 is placed beneath the surface of a body of water in order to generate an electrical energy output for underwater needs. The housing 212 is waterproof. Air inlet tube 228 provides air from above the water level into the chamber within the housing 212. A disc-like fly wheel assembly 230 mounted on shaft 232 is placed for rotation in bearings 234 and 236. The surrounding water 238 can aid in the cooling of the heat produced. Engines 240 mounted onto the disc 230 are provided with air scoops 244 and outlet openings 252. A fuel line 260 is brought in from the surface and supplies fuel to the engines as described earlier in this application in the preferred embodiment. A bearing 262 is placed beneath the disc 230 and a levitation coil 264 with the steel ring 266 act in the same manner as the previous form described. Additionally, an electrical generating annular coil 268 incited by permanent magnets 269 generates the electricity needed for the levitation and the ignition processes. The generator assembly 270 with its cooling jacket 276 is mounted onto the shaft 232. A canard lifting means 278 can be added to the assembly. A control unit 280 to control the various functions is shown placed within the housing.

In the alternate embodiment of FIG. 10, the schematic perspective shows a spacecraft 300 having a housing 312 and a sealed chamber 324 contain the power generating assembly. A disc-like fly wheel assembly 330 affixed to a shaft 332 rotatably mounted in bearings 334 and 336 are shown. Engines 340 are operated by means of an electrical current gathered by a solar panel 350 which activates a laser 356. The laser beam 358 acts upon a solid propellant 360 and creates sufficient energy to cause jet propulsion within the engines 340. A generator assembly 370 can then be activated by means of the rotating assembly and a substantial output of power is thereby created for operating the necessary functions of a spacecraft.

FIG. 11 indicates a plan view similar to FIG. 1 but with an alternate method of installing jet type engines. In this figure the disc 430, mounted on shaft 432, has two types of engines mounted thereon. A pair of ramjet engines 440a are mounted opposite a pair of turbo jets 440b. This combination allows for slow starting with the turbojet engines, and more rapid speed attainment by the ramjets. A canard lift means 480 is shown installed onto the shaft 432.

FIG. 12 illustrates the utilization of the exhaust gases produced by the jet propulsion engines. The assembly 600 is shown having a housing 612 with cylindrical side wall 614 tapering at 616 to an exhaust 618. A frame 622 supports the housing 612 and an annular chamber 624. An annular slot 626 allows the disc-like fly wheel 630 to project there through. The air inlet passages 628 are placed in this instance at the upper end of the housing. The disc fly wheel 630 is mounted on a shaft 632 which in turn is mounted for rotation in bearings 634 and 636. Ramjet engines 640 are mounted to the disc 630 and receive air through scoops 634 from the upper portion of the housing. A levitation coil 664 acts onto steel ring 666 and tends to reduce the friction of the rotating elements. A generating coil 668 acted upon by magnets 669 provides the power for this levitation coil and for the ignition of the engines. The generator assembly 670 is mounted to the shaft 632 and supports the rotor 672 within a stator 674. Cooling means 676 is provided to keep the generator assembly from overheating. A canard type lift 678 is added to the shaft above the disc. An automatic control unit 680 is mounted to the housing 612. In this embodiment the exhaust gases which are ejected from the ramjet engines provide an additional lifting force to the underside of the disc 630 to further minimize the friction. This action is similar to that of a hovercraft.

FIG. 13 schematically illustrates a series of functions that can be performed with the exhaust gases that have been generated by the propulsion engines. In FIG. 13a the energy generating mechanism 700 having its disc 730 rotated by ramjet engines 740 has an exhaust opening 718 which leads to an accumulator 719. This accumulated gas can then be released at a later time to a starter mechanism in order to get the disc assembly to begin its rotation. The assembly 800 in FIG. 13b has a rotating disc 830 actuated by engines 840 has its exhaust 818 going to and actuating a heater 819. The embodiment shown in FIG. 13c shows an assembly 900 with its disc 930 actuated by engines 940 leading through an exhaust port 970 to operate a turbine 919. This turbine can perform a number of functions and to some degree recover energy expended by the operation of the jet propulsion engines.

The construction of the disc-like fly wheel member 30 can be of the type that is described in the *Popular Science* article entitled "Energy Storage: Search For the Perfect Fly Wheel", January 1980. Also, from *Popular Science*, October 1979 an article entitled "Basement Fly Wheel Stores Solar Energy at 15000 RPM".

While the embodiments of this invention shown and described are fully capable of achieving the objects and advantages desired, it is to be understood that such embodiments are for the sole purpose of illustration and not for the purpose of limitation.

I claim:

1. The method for converting fuel energy to mechanical or electrical energy which comprises: (1) affixing a circular disc means onto a shaft means at a point between the ends of said shaft means; (2) mounting said ends of said shaft means for rotation within bearing means; (3) affixing said bearing means to a frame means; (4) affixing at least one jet propulsion engine means onto said circular disc means proximate the outer edge of said circular disc means; (5) providing fuel to said jet propulsion engine means through a fuel conduit means; (6) placing a electromagnetic bearing means at the outer edge of said circular disc means for aiding the relieving of the pull of gravity upon said circular disc means and its associated jet propulsion engine means; (7) providing an electrical generating means at the periphery of said circular disc means in order to provide ignition energy for said jet propulsion engine means and the energy for energizing said electromagnetic bearing means; and (8) providing speed control means for controlling the rotational speed of said circular disc means.

* * * * *